(12) United States Patent
Shirane

(10) Patent No.: US 6,198,709 B1
(45) Date of Patent: Mar. 6, 2001

(54) SIGNAL RECORDING/REPRODUCING DEVICE AND FAULT CONTROL METHOD FOR SIGNAL RECORDING AREA

(75) Inventor: Kyoichi Shirane, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/290,003

(22) Filed: Apr. 7, 1999

Related U.S. Application Data

(63) Continuation of application No. PCT/JP98/03607, filed on Aug. 12, 1998.

(30) Foreign Application Priority Data

Aug. 12, 1997 (JP) .................................................... 9-217776

(51) Int. Cl.⁷ ...................................................... G11B 7/00
(52) U.S. Cl. ................................ 369/58; 369/57; 369/47
(58) Field of Search ................................... 369/47, 48, 49, 369/50, 54, 58, 59; 360/48, 53, 54, 39

(56) References Cited

FOREIGN PATENT DOCUMENTS

| 57-94913 | 6/1982 | (JP) . |
|---|---|---|
| 57-167143 | 10/1982 | (JP) . |
| 60-128528 | 7/1985 | (JP) . |
| 62-52762 | 3/1987 | (JP) . |
| 1-196775 | 8/1989 | (JP) . |
| 2-44582 | 2/1990 | (JP) . |
| 2-177064 | 7/1990 | (JP) . |
| 4-32076 | 2/1992 | (JP) . |
| 4-266117 | 9/1992 | (JP) . |
| 4-358360 | 12/1992 | (JP) . |
| 5-189876 | 7/1993 | (JP) . |
| 6-76216 | 3/1994 | (JP) . |
| 6-76492 | 3/1994 | (JP) . |
| 8-111074 | 4/1996 | (JP) . |

Primary Examiner—Muhammad Edun
(74) Attorney, Agent, or Firm—Limbach & Limbach L.L.P.

(57) ABSTRACT

Information signals recorded in a signal recording area of a magnetic disk 100 are reproduced for each sector unit by a magnetic head 3, and are taken out through an equalizer 8, an ECC circuit 9 and a buffer 10. A control circuit 12 obtains an estimate value indicating the difficulty of reproduction with respect to operation for reproducing the information signals from the magnetic disk 100, and accumulates the estimate value obtained until the information signals can be correctly reproduced. When the accumulated estimate value has become a predetermined value or greater, the control circuit 12 carried out control to record the information recorded in the corresponding sector into another sector. Thus, generation of such a state that the information signals cannot be reproduced in the future can be prevented.

10 Claims, 14 Drawing Sheets

SIGNAL RECORDING/REPRODUCING DEVICE AND FAULT CONTROL METHOD FOR SIGNAL RECORDING AREA

This application is a continuation of PCT/JP98/03607 filed Aug. 12, 1998.

TECHNICAL FIELD

This invention relates to a signal recording/reproducing device used for recording or reproducing information signals to or from a signal recording medium, and a fault control method for a signal recording medium adapted for controlling a fault in a signal recording area of the signal recording medium to which information signals are recorded.

BACKGROUND ART

Conventionally, in a disk-like signal recording medium, target data are recorded by each sector, and recording and reproduction of data to and from the signal recording medium is carried out by using a signal recording/reproducing device.

For example, control of a fault in the signal recording area such as sectors of the signal recording medium is carried out as follows. When a fault is found in a sector at the stage of formatting the signal recording medium, the address of the sector having the fault is registered, that is, recorded in a predetermined area of the signal recording medium, and it is eliminated from allocation of the logical address.

FIG. 1 shows the steps at the time of inspection and shipment after manufacture of a hard disk, and FIG. 2 shows the steps at the time of inspection and shipment after manufacture of a floppy disk. As shown in FIGS. 1 and 2, fault control as described above is carried out at the inspection step (step S102 or S107) after the step of manufacturing a magnetic disk such as a hard disk or a floppy disk (step S101 or S106).

In the case of the hard disk, for example, it is discriminated whether or not there is a fault in the recording area (step S103), as shown in FIG. 1. If there is no fault, the hard disk is shipped as it is (step S104). If there is a fault, the map of the logical address is updated, that is, the fault sector is eliminated from allocation of the logical address so as to prevent data from being recorded into the fault sector (step S105), and then the hard disk is shipped (step S104).

In the case of the floppy disk, it is discriminated whether or not there is a fault in the recording area (step S108). If there is no fault, the floppy disk is shipped (step S109). If there is a fault, the floppy disk is not shipped (step S110).

Meanwhile, in an optical disc such as a magneto-optical disc, fault control as shown in FIGS. 3 and 4 is carried out. First, in FIG. 3, inspection is carried out (step S122) after manufacture (step S121). It is then discriminated whether or not there is a fault in the recording area (step S123). If there is a fault, the map of the logical address is updated so as to prevent data from being recorded in the fault sector (step S124), and then the optical disc is shipped (step S125).

Then, as shown in FIG. 4, after the optical disc such as the magneto-optical disc is purchased by a user (step S126), data are recorded (step S127). At this point, the recorded data are reproduced (step S128), and it is detected whether or not the recorded data could be reproduced (step S129). If the data could not be reproduced, data are rerecorded in a recordable sector (step S130), and the map is updated so as to prevent the data from being recorded in the fault sector (step S131).

If the recording/reproducing device for recording/reproducing signals to/from the signal recording medium has failed to reproduce data recorded on the signal recording medium, it carries out reproducing operation again after changing the tracking and the parameter of an equalizer which affect the reproducing characteristics.

The signal recording/reproducing device or recording medium driving device adds redundant bits for error correction to the data and then records the data to the signal recording medium, in order to improve the reliability of the data to be recorded.

Meanwhile, even if data reproduction is successfully carried out by re-try operation for data reproduction in the case where reproduction of the data recorded on the signal recording medium has failed, there is no guarantee that next reproduction will be successfully carried out. Rather, if data reproduction is successfully carried out by re-try operation with the parameters changed as described above, it should be assumed that the corresponding sector becomes very difficult to read and that the reliability of reproduction of that sector is lowered. Lowering of the reliability of data reproduction often proceeds with the lapse of time.

Namely, in the conventional signal recording/reproducing device, it is possible to prevent the initial fault detected and registered into the map at the manufacturing step from being used by a fault management method of eliminating the fault from allocation of logical addresses.

In the conventional signal recording/reproducing device, the retry operation is carried out to execute read-out operations again in the case where a data read out has failed. However, it has not been practiced to rewrite the sector which becomes difficult to read out into another signal recording region by e.g., the alternate shift processing, as the need arises.

As described above, conventionally, the reliability of future data recording and reproduction cannot be secured with respect to a portion in which the reliability is lowered during the use or a portion in which lowering of the reliability proceeds with the lapse of time.

DISCLOSURE OF THE INVENTION

In view of the foregoing status of the art, it is an object of the present invention to provide a signal recording/reproducing device and a fault control method for a signal recording area which enable prevention of generation of such a state that information signals cannot be reproduced in the future.

A signal recording/reproducing device according to the present invention includes: reproduction means for reproducing information signals recorded on a signal recording medium from each unit recording area; estimate value obtaining means for obtaining an estimate value indicating the difficulty of reproduction with respect to operation for reproducing the information signals from each unit recording area by the reproduction means; accumulation means for accumulating a plurality of estimate values obtained by the estimate value obtaining means until reproduction of the information signals from each unit recording area is correctly carried out; and recording means for recording the information signals recorded in a corresponding unit recording area into another unit recording area when the estimate value accumulated by the accumulation means has become a predetermined value or greater.

A fault control method for a signal recording medium according to the present invention includes the steps of: reproducing information signals recorded on a signal recording medium from each unit recording area by reproduction means; detecting whether or not the information signals could be correctly reproduced by the reproduction means; changing a parameter related to reproducing operation of the reproduction means and repeatedly reproducing the unit recording area, when the information signals could not be correctly reproduced; obtaining an estimate value having a value corresponding to the parameter for each step of repeated reproduction; accumulating the estimate value; and recording the information signals recorded in the unit recording area into another unit recording area of the signal recording medium when the accumulated estimate value has become a predetermined value or greater.

BEST MODE FOR CARRYING OUT THE INVENTION

A preferred embodiment of the present invention will now be described with reference to the drawings.

In this embodiment, the present invention is applied to a signal recording/reproducing device which is capable of recording and reproducing signals to and from a signal recording medium such as a magnetic disk, and particularly to a recording/reproducing device for a flexible disk such as a floppy disk.

The signal recording/reproducing device is constituted for carrying out reproduction of signals from each sector unit as a unit recording area of a signal recording area of a magnetic disk, then rerecording the signals recorded in the sector into another sector when the reliability of reproduction is lowered, and changing the address map so as to prevent the signals from being recorded again into the sector of the lowered reliability.

Specifically, in the signal recording/reproducing device as the embodiment of the present invention, unlike verification at the time of recording signals onto the magnetic disk, when reproducing signals recorded on the magnetic disk, the sector from which signals could be reproduced for the first time after several times of re-try operation is determined as a sector of low reproduction reliability, and the signals recorded in that sector are recorded into another sector, that is, a so-called alternate sector.

Figure 1:
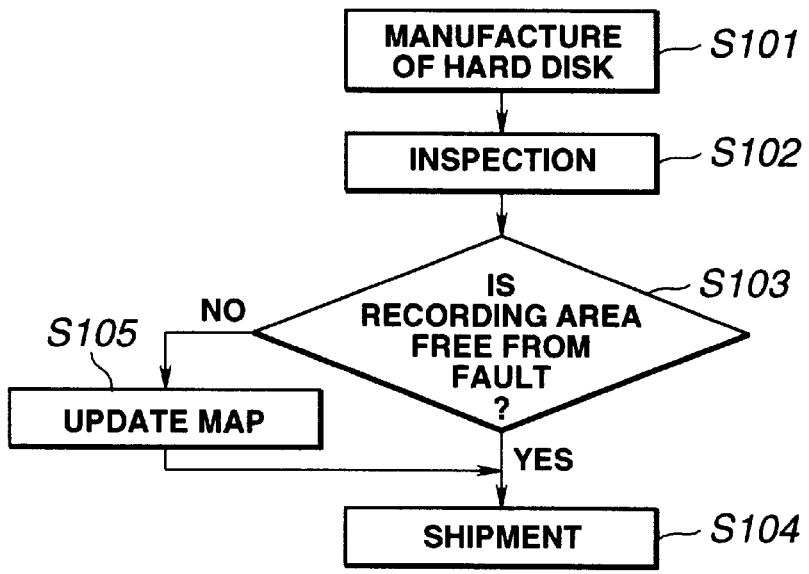
FIG. 1 is a flowchart for explaining conventional processing at the time of inspection and shipment after manufacture of a hard disk.
Figure 2:
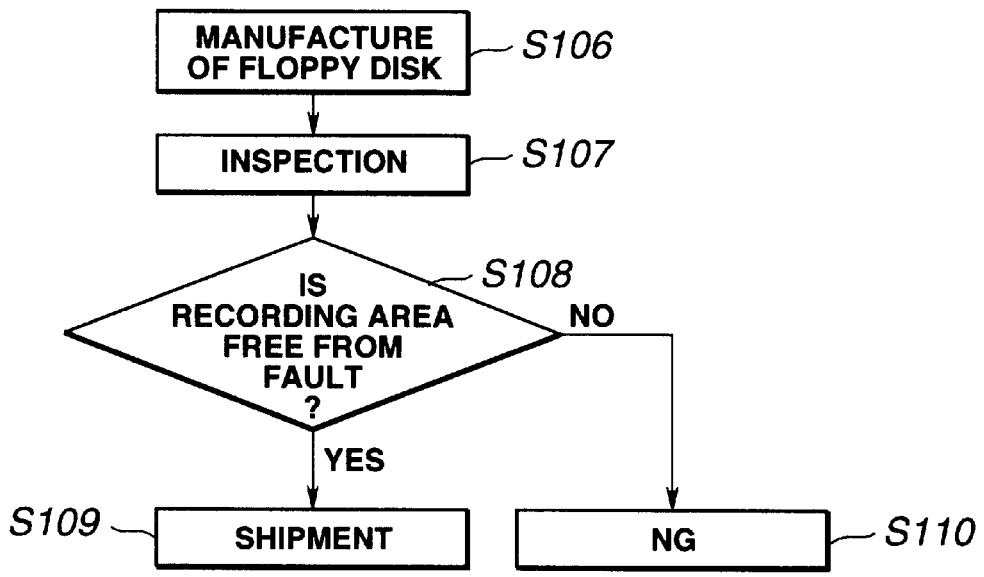
FIG. 2 is a flowchart for explaining conventional processing at the time of inspection and shipment after manufacture of a floppy disk.
Figure 3:
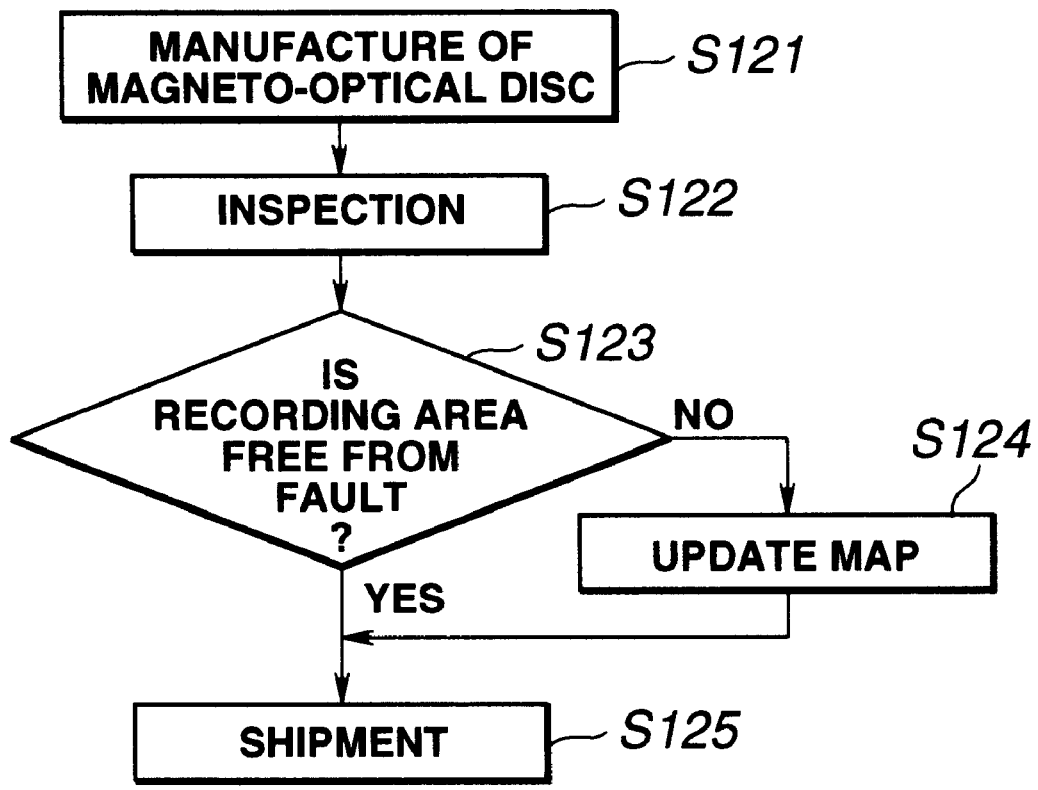
FIG. 3 is a flowchart for explaining conventional processing at the time of inspection and shipment after manufacture of a magneto-optical disc.
Figure 4:
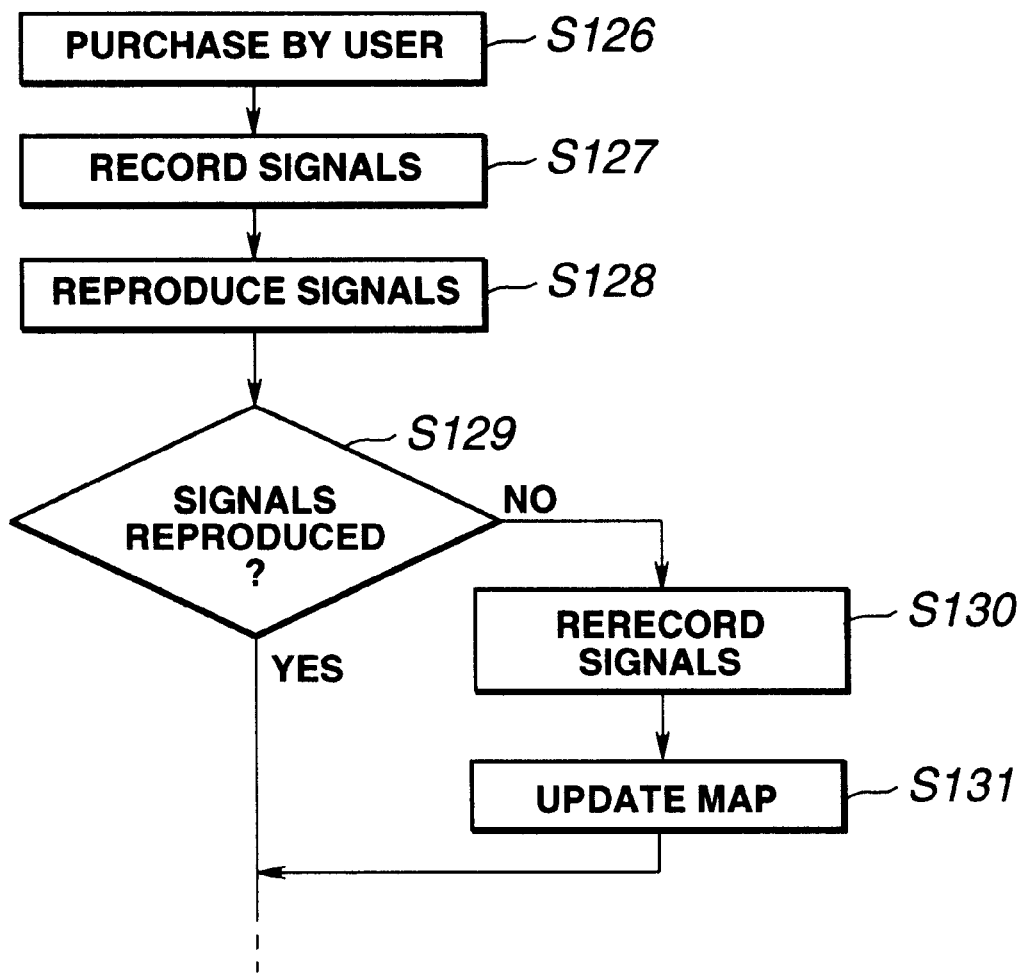
FIG. 4 is a flowchart for explaining processing at the time when signals are reproduced by a conventional signal recording/reproducing device after the magneto-optical disc is purchased by a user.
Figure 5:
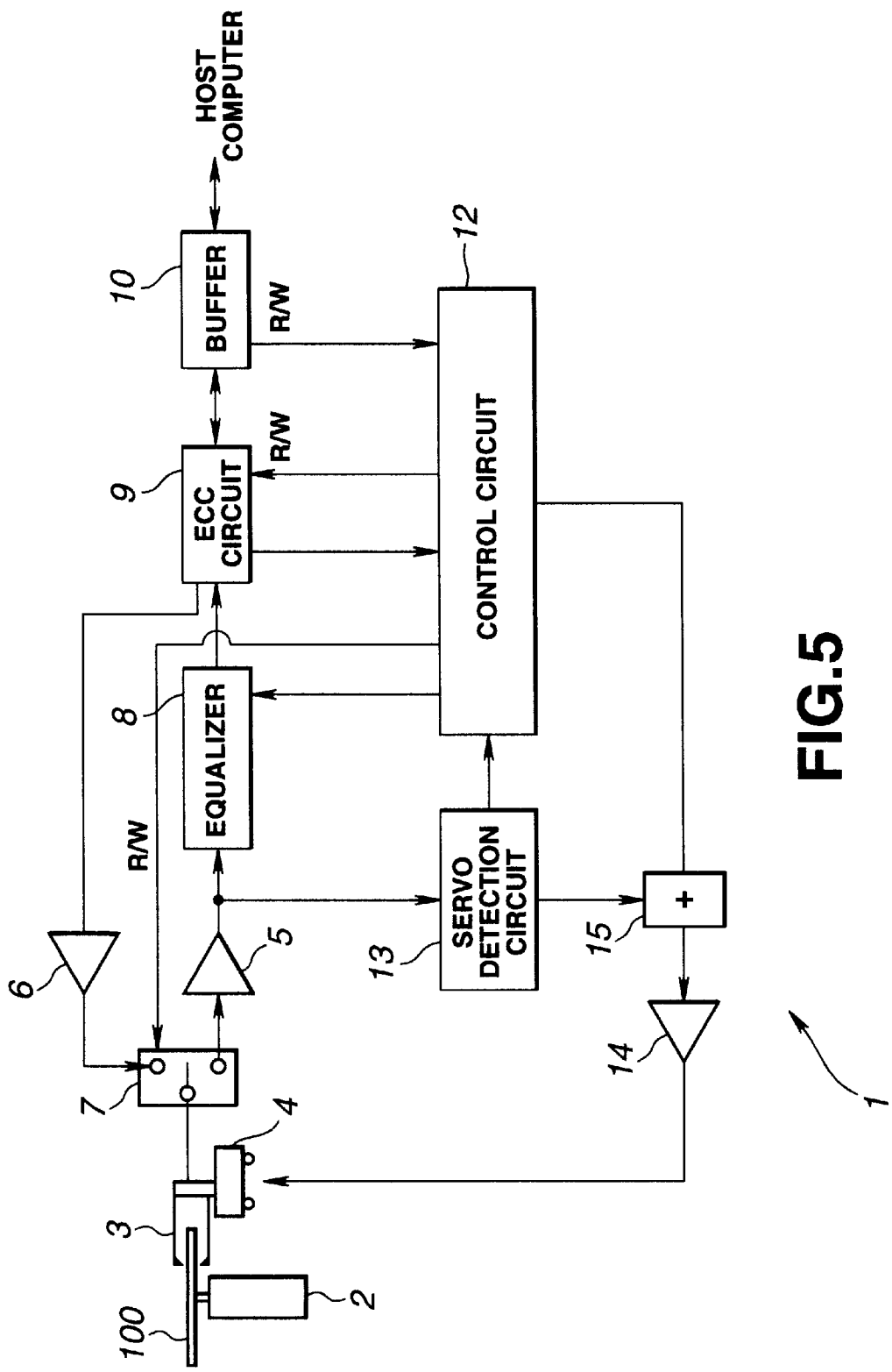
FIG. 5 is a circuit diagram showing the structure of a signal recording/reproducing device as an embodiment of the present invention.

As shown in FIG. 5, the signal recording/reproducing device 1 has a spindle motor 2 for rotating a magnetic disk 100, a magnetic head 3 for recording and reproducing signals onto and from a signal recording surface of the magnetic disk 100, and an actuator 4 for moving the magnetic head 3 along the direction of radius of the magnetic disk 100. The signal recording/reproducing device 1 also has a signal amplification circuit 5 for amplifying the signal level of information signals reproduced by the magnetic head 3, a signal amplification circuit 6 for amplifying the signal level of information signals transmitted from an ECC circuit (error correction code coding/decoding circuit) 9 for recording onto the magnetic disk 100, a switch 7 for switching the signal amplification circuits 5 and 6, and an equalizer 8 for adjusting the signal characteristics of the signal amplified by the signal amplification circuit 5. The signal recording/reproducing device 1 also has the ECC circuit 9 for decoding an error correction code with respect to the signal which has its signal characteristics adjusted by the equalizer 8, a buffer 10 for temporarily storing the signals outputted from the ECC circuit 9 and signals from a host computer 11, a servo detection circuit 13 for detecting a servo signal from the output signals from the signal amplification circuit 5 and outputting the servo signal to a control circuit 12, and a mixing circuit 15 for outputting a tracking error signal obtained from the servo signal and an offset signal from the control circuit 12 to the actuator 4 through a signal amplification circuit 14.

The control circuit 12 is constituted by, for example, a DSP circuit. The control circuit 12 has an estimate value obtaining function and a signal recording area shift processing function. The control circuit 12 also has a function for controlling the signal recording/reproducing section such as the magnetic head 3 until signals are reproduced from a target sector of the magnetic disk 100, and then causing the signal recording/reproducing section to carry out signal recording/reproducing operation. For example, the control circuit 12 controls the switch 7, the ECC circuit 9 and the buffer 10 in accordance with a read or write command.

In the signal recording/reproducing device 1 having the above-described structure, in reproducing operation carried out until the signal recording/reproducing section can reproduce the signals recorded on the magnetic disk 100, an estimate value in accordance with the degree of error correction and the contents of re-try operation is obtained, and signals of a sector in which the obtained estimate value has reached a predetermined value are copied to an alternate sector.

Specifically, the control circuit 12 obtains an estimate value indicating the difficulty of reproduction with respect to the operation for reproducing information signals from the magnetic disk 100, and accumulates the estimate value obtained until correct reproduction is carried out. When the accumulated estimate value has become a predetermined value or greater, the control circuit 12 carries out control to record information signals recorded in the corresponding sector into another sector.

Thus, generation of such a state that information signals cannot be reproduced in the future can be prevented.

The signals recorded on the magnetic disk 100 and the reproducing operation for the magnetic disk 100 will now be described.

Figure 6:
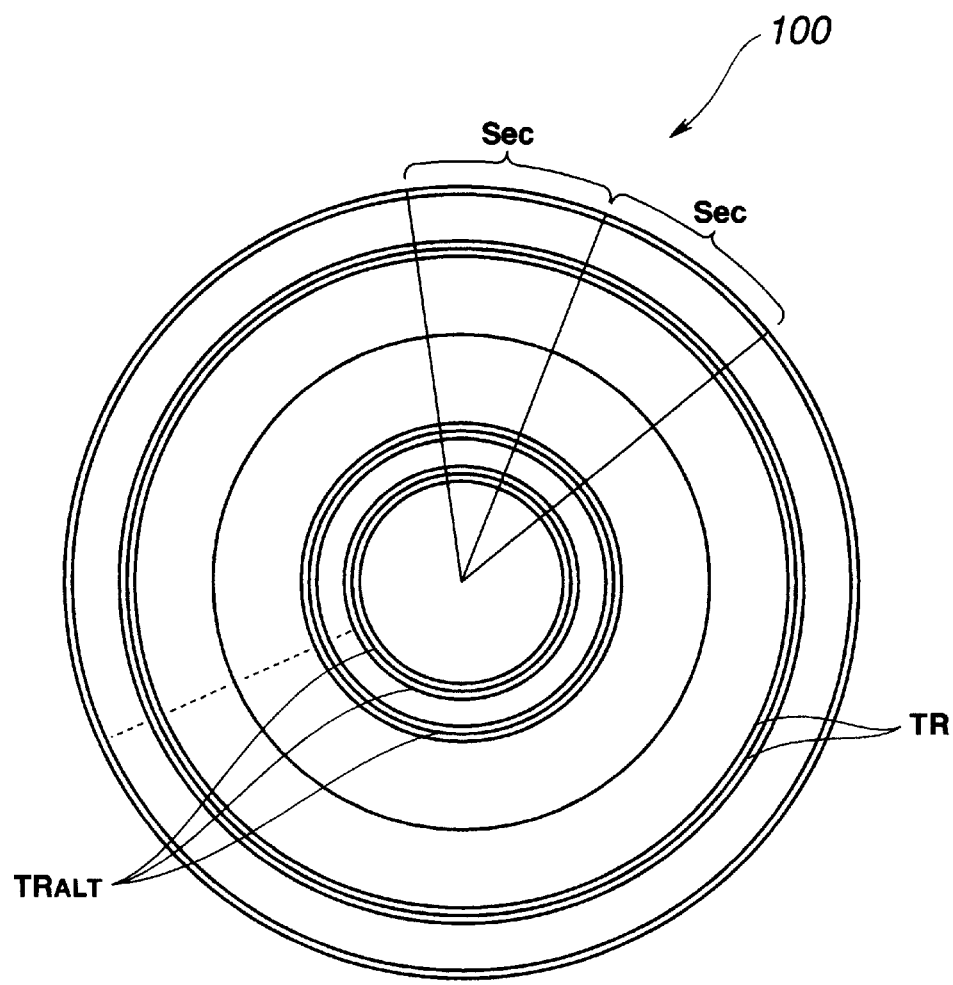
FIG. 6 shows an example of recording track and sector on a magnetic disk.

FIG. 6 schematically shows recording tracks of the magnetic disk 100. A plurality of tracks TR are concentrically or spirally formed by recording, and a plurality of sectors Sec are formed in a divided manner along the circumference of the tracks. In each sector, a servo area is provided in which a servo signal for carrying out tracking servo is recorded. In a predetermined area of the magnetic disk 100, for example, in a predetermined area on the innermost side, alternate tracks $TR_{ALT}$ to be an area for alternate sectors are provided.

In the signal recording/reproducing device 1, signals recorded on the magnetic disk 100 rotated by the spindle motor 2 are reproduced by the magnetic head 3. The signals reproduced by the magnetic head 3 are inputted to the signal amplification circuit 5 through the switch 7 connected to the reproducing side in a switchable manner by the control circuit 12.

The signals inputted to the signal amplification circuit 5 are amplified by this signal amplification circuit 5 and then inputted to the ECC circuit 9 through the equalizer 8. The output signals from the signal amplification circuit 5 are also inputted to the servo detection circuit 13.

The ECC circuit 9 is a circuit for carrying out error correction with respect to the signals reproduced from the magnetic disk 100. The ECC circuit 9 reports to the control circuit 12 the number of correction bytes at the time of error correction of the signals inputted through the equalizer 8.

The control circuit 12 causes the parameter of the equalizer 8 to be changed in accordance with the number of error bytes, as the operation for affecting the reproducing characteristics of the signals. The parameter is exemplified by the filter gain of a filter constituting the equalizer 8.

The servo detection circuit 13 detects a servo signal in the inputted signals, then generates a tracking error signal based on the servo signal, and supplies the tracking error signal to the control circuit 12. The control circuit 12 changes and adds the tracking offset quantity to the tracking error signal, as the parameter affecting the reproducing characteristics of the signals, and thus controls the actuator 4. The offset quantity is zero at the time of first reproduction.

After changing the parameter affecting the reproducing characteristics of the signals as described above, the control circuit 12 carries out re-try operation, that is, reproducing operation again. Meanwhile, the control circuit 12 may carry out the re-try operation for several times without changing the parameter and then change the parameter to carry out the re-try operation for several times again. In this case, every time the parameter is changed, the re-try operation is carried out for a plurality of times.

When the signals can be reproduced as a result of such re-try operation, that is, repeated reproducing operation, the control circuit 12 causes the buffer 10 to store the reproduced signals and discriminates whether or not the error counter value is greater than a limit value $E_0$.

If the error counter value is greater than the limit value $E_0$, that is, if it is determined that the reliability of signal reproduction is lowered, the control circuit 12 records the signals stored in the buffer 10 into another signal recording area of the magnetic disk 100. This another signal recording area is an alternate sector which is provided on the recording medium in advance and included in the alternate tracks $TR_{ALT}$ of FIG. 6.

Specifically, the control circuit 12 records the signals stored in the buffer 10 into the alternate sector of the magnetic disk 100 through the ECC circuit 9 and the signal amplification circuit 6. Then, the control circuit 12 updates the logical address map of the sector so as to prevent the signals from being recorded into the sector of lowered signal reproduction reliability. This address map, too, is recorded into a predetermined area on the magnetic disk 100.

Slipping processing and shift processing in the magnetic disk 100 will now be described with reference to FIGS. 7 to 10.

Figure 7:
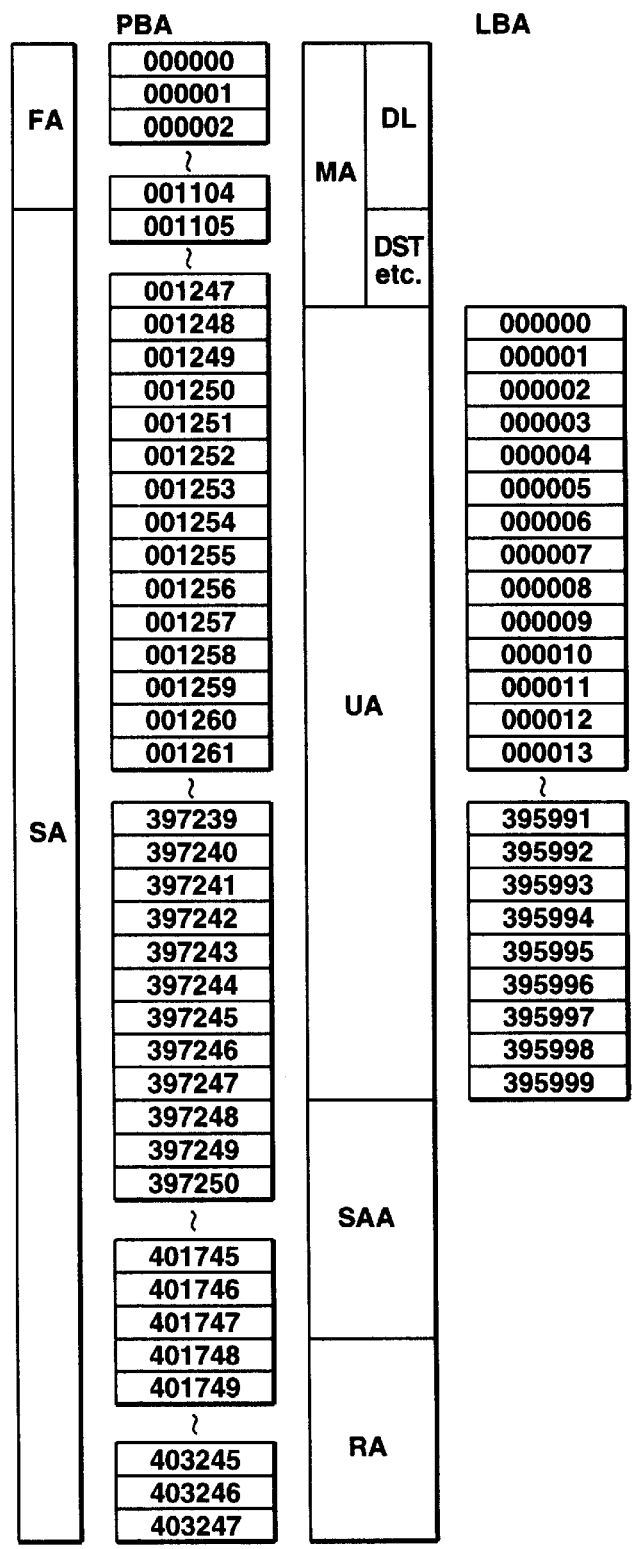
FIG. 7 shows the relation between the physical address PBA and the logical address LBA on the disk in the case where slip shift processing is not carried out.
Figure 8:
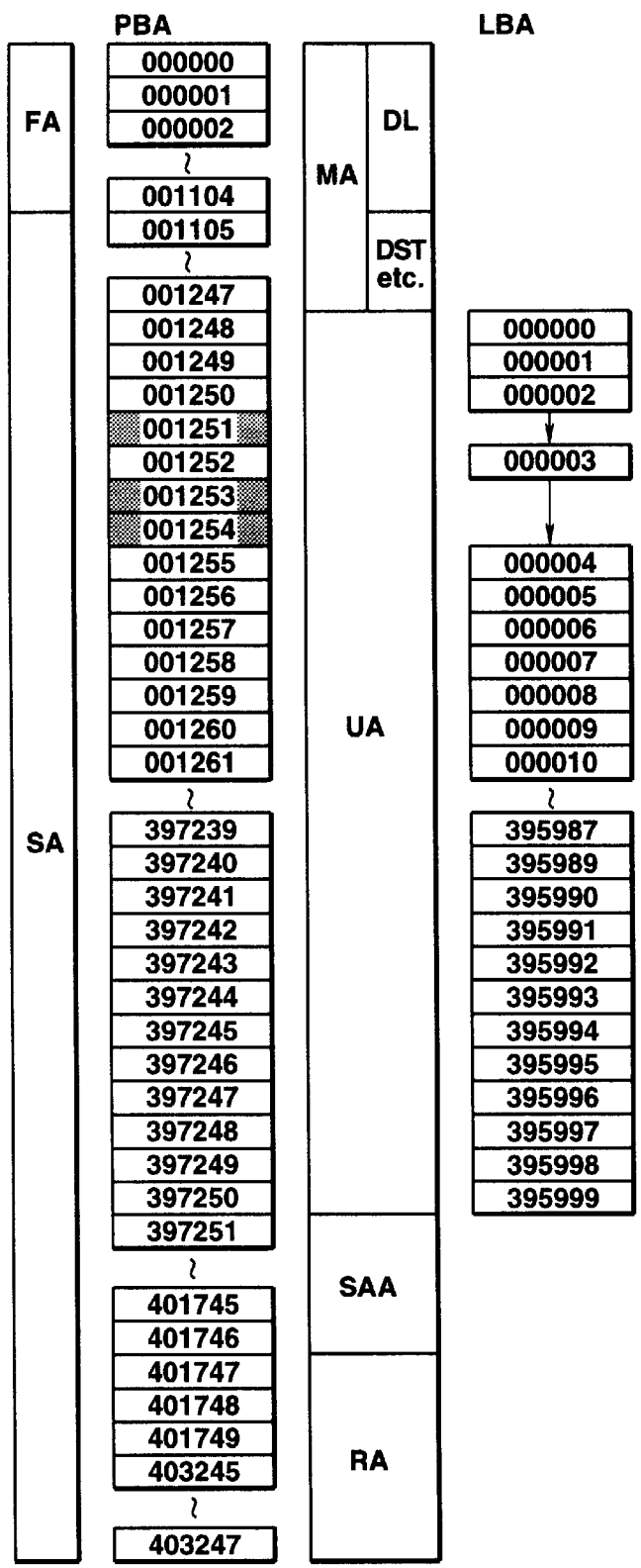
FIG. 8 shows the relation between the physical address PBA and the logical address LBA on the disk in the case where slip shift processing is carried out.

FIGS. 7 and 8 are views for explaining slip shift management. Specifically, slipping processing or slip shift processing is carried out when a fault sector is detected in carrying out physical formatting of the recording medium before shipment of the medium. FIG. 7 shows the state before processing, and FIG. 8 shows the state after processing.

FIG. 7 shows the relation between the physical address PBA and the logical address LBA on the disk in the case where slip shift processing is not carried out. "000000" to "001104" of the physical address PBA are defined as a fixed area FA, and "001105" to "403247" are defined as a slipping target area SA. "000000" to "001247" of the physical address PBA are defined as a maintenance area MA, and "000000" to "001104" thereof are defined as a defect list DL indicating a defective address such as a fault sector. "001248" to "397247" of the physical address PBA are defined as a user area UA corresponding to "000000" to "395999" of the logical address LBA. "397428" to "401747" of the physical address PBA are defined as a slip shift processing area SAA, and "401748" to "403247" are defined as a non-used area RA.

FIG. 8 shows the case where slip shift processing is carried out as a fault sector is generated. In this example, fault sectors are generated at "001251", "001253" and "001254" of the physical address PBA. In the slip shift processing, the logical address LBA is allocated so as to avoid these fault sectors and use normal sectors. Although the user area UA is short of normal sectors by the number of fault sectors, normal sectors in the slip shift processing area SAA are allocated for the shortage.

Figure 9:
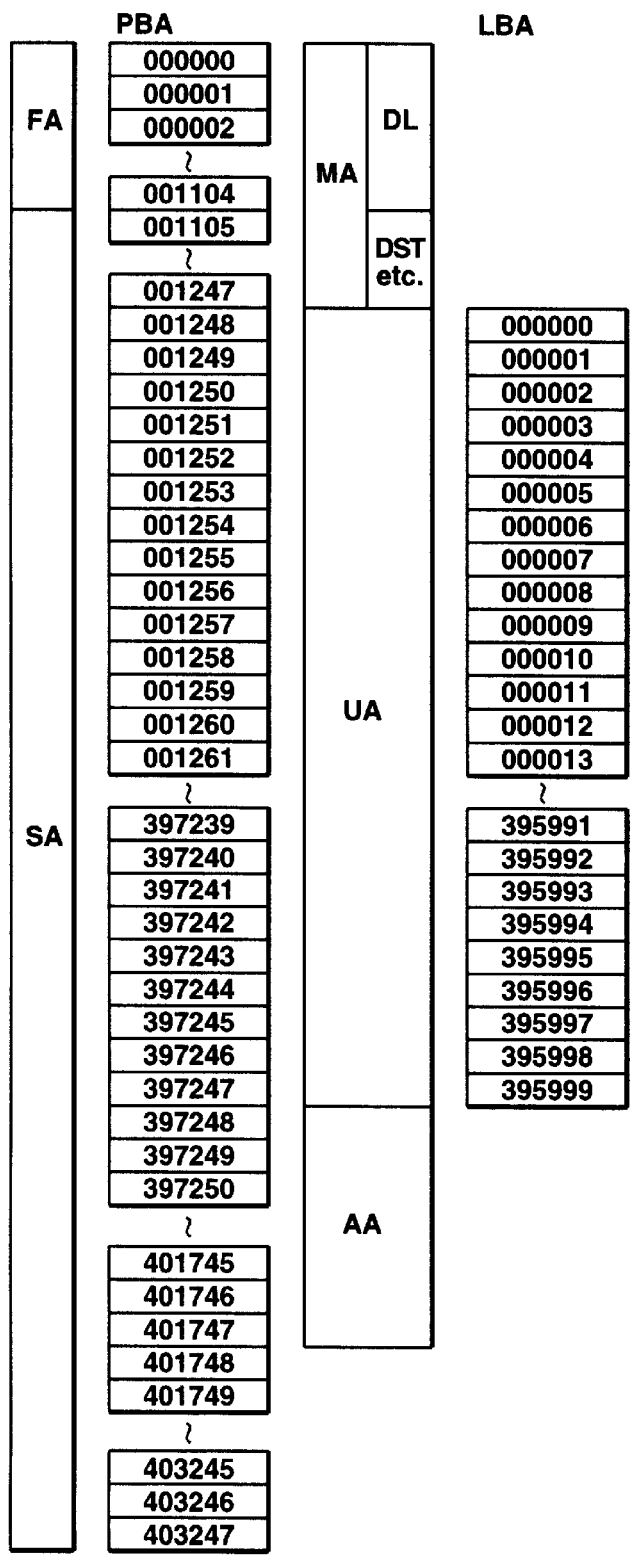
FIG. 9 shows the relation between the physical address PBA and the logical address LBA on the disk in the case where alternate shift processing is not carried out.
Figure 10:
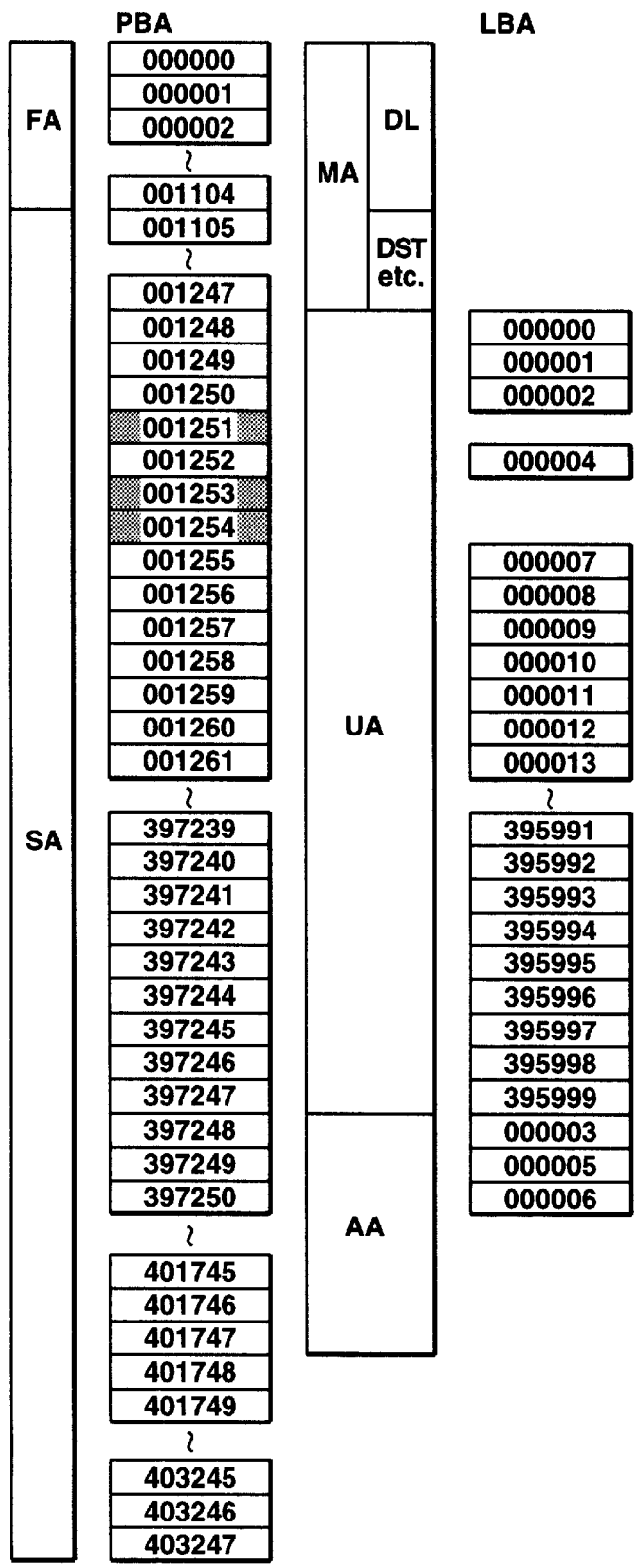
FIG. 10 shows the relation between the physical address PBA and the logical address LBA on the disk in the case where alternate shift processing is carried out.

On the other hand, in the case where a fault sector is generated after physical formatting, the signal recording/reproducing device carries out alternate shift processing. FIG. 9 shows the relation between the physical address PBA and the logical address LBA in the case where alternate shift processing is not carried out. FIG. 10 shows the relation between the physical address PBA and the logical address LBA in the case where alternate shift processing is carried out.

In FIG. 9, "000000" to "001104" of the physical address PBA are defined as a fixed area FA, and "001105" to "403247" are defined as a slipping target area SA. "000000" to "001247" of the physical address PBA are defined as a maintenance area MA, and "000000" to "001104" thereof are defined as a defect list DL indicating a defective address such as a fault sector. "001248" to "397247" of the physical address PBA are defined as a user area UA corresponding to "000000" to "395999" of the logical address LBA. "397428" to "401747" of the physical address PBA are defined as an alternate shift processing area AA.

When a fault sector is generated during signal recording/ reproduction of the recording medium, alternate shift processing is carried out. As in the above-described embodiment, a sector in which the reliability is lowered by an estimate value related to the re-try operation at the time of signal reproduction is assumed as a fault sector, and alternate shift processing is carried out. In the example of FIG. 10, fault sectors are generated at "001251", "001253" and "001254" of the physical address PBA, and the logical address is re-allocated to the alternate shift processing area AA so as to avoid these fault sectors and use normal sectors. In the example of FIG. 10, "397248", "397249" and "397250" of the physical address PBA are allocated to "000003", "000005" and "000006" of the logical address LBA.

As described above, in the signal recording/reproducing device 1, the weighting coefficient is accumulated as a quantitative reference with respect to execution of the signal reproduction re-try operation and error correction processing. When the accumulated weighting coefficient has reached a predetermined value, the corresponding sector is assumed as a fault sector and signals are rerecorded into an alternate sector allocated to the alternate shift processing area AA, thereby securing the reliability in the subsequent signal reproduction.

Thus, the signal recording/reproducing device 1 enables prevention of generation of such a state that the signals cannot be reproduced in the future. For example, the signal recording/reproducing device 1 assumes a sector in which the reliability is lowered by an estimate value corresponding to the operation at the time of re-try, as a fault sector, and carries out alternate shift processing, before dust particles or stain unables the signals to be reproduced. Thus, the frequency of generation of a fatal fault such as impossible reproduction can be reduced, and generation of such a state that the signals cannot be reproduced in the future can be prevented.

A specific example of alternate shift processing in accordance with the re-try operation during signal reproduction in the signal recording/reproducing device 1 as described above will now be described with reference to the flowcharts of FIGS. 11 to 13. Such series of operations are carried out mainly by the control circuit 12 of the signal recording/ reproducing device 1 shown in FIG. 5.

Figure 11:
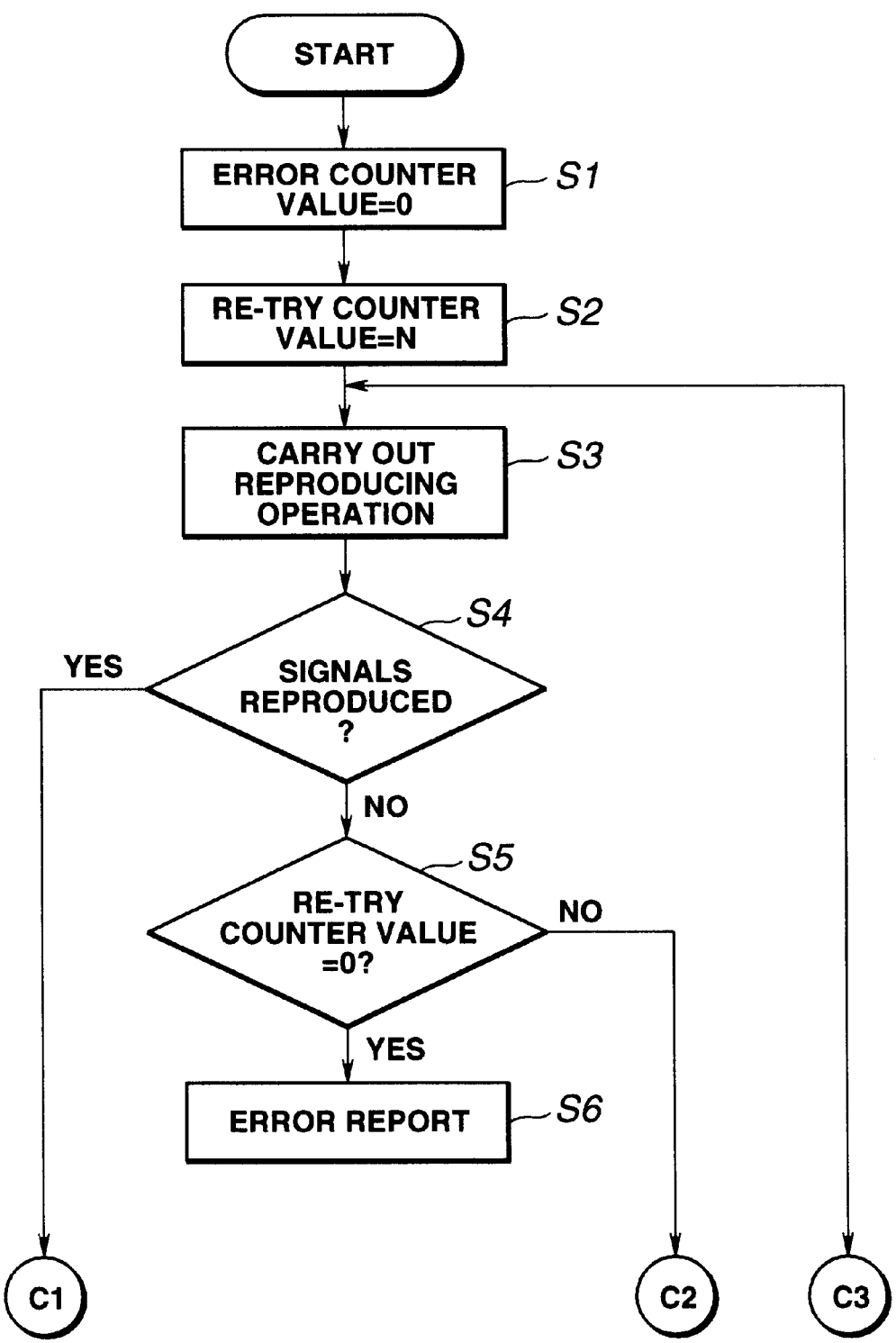
FIG. 11 is a flowchart for explaining the former half of signal reproducing and recording processing by the signal recording/reproducing device.

First, in FIG. 11, the control circuit 12 of the signal recording/reproducing device 1 sets the error counter value at 0, at step S1, and then sets the re-try counter value at an initial value N, at step S2. The control circuit 12 then proceeds to step S3.

At step S3, the control circuit 12 switches the switch 7 to the reproducing side, and carries out signal reproducing processing from the magnetic disk 100 by using the magnetic head 3. Then, the control circuit 12 proceeds to step S4.

At step S4, the control circuit 12 discriminates whether or not the signals could be correctly reproduced as a result of signal reproducing processing. The case where this signal reproduction cannot be correctly carried out includes the case where the servo signal cannot be reproduced or the case where error correction cannot be carried out. At this point, if the control circuit 12 has confirmed that signal reproduction could be correctly carried out, the control circuit 12 proceeds to step S5. If signal reproduction could not be correctly carried out, the control circuit 12 proceeds to step S10 shown in FIG. 12.

At step S5 in the case where the signals could be reproduced, the control circuit 12 of the signal recording/ reproducing device 1 discriminates whether the re-try counter value is 0 or not. If the re-try counter value is not 0, the control circuit 12 proceeds to step $S7_1$ shown in FIG. 13. If the re-try counter value is 0, the control circuit 12 proceeds to step S6 to carry out error report.

The error report at step S6 is the processing for reporting to the host computer that the signals could not be reproduced even by carrying out re-try operation. The error report is carried out when the signals could not be read out because of a fatal fault.

Figure 13:
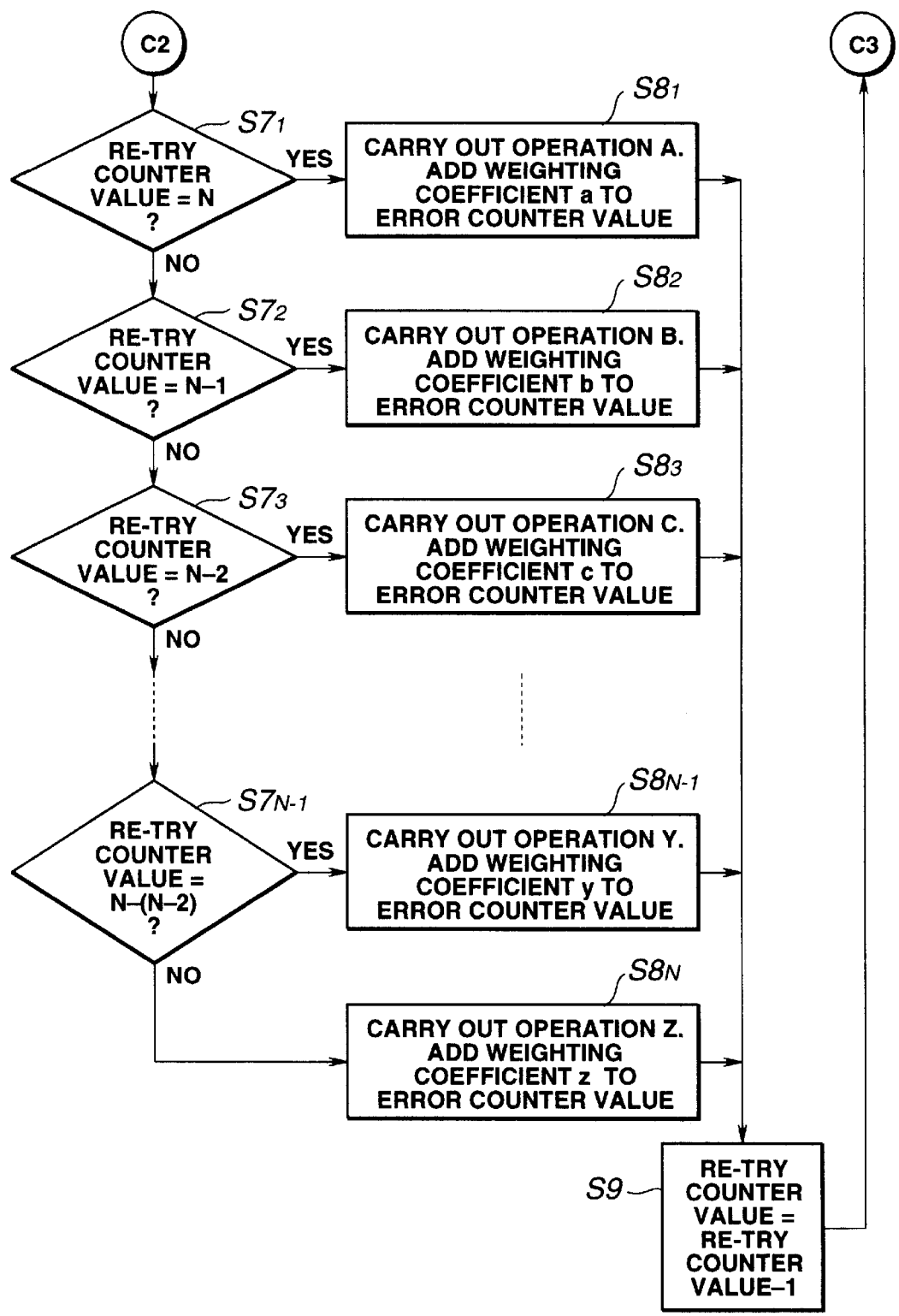
FIG. 13 is a flowchart for explaining the latter half of signal reproducing and recording processing by the signal recording/reproducing device, that is, for explaining various re-try operations in accordance with the re-try counter value.

At step $S7_1$ of FIG. 13 in the case where the re-try counter value is not 0, the control circuit 12 of the signal recording/ reproducing device 1 discriminates whether the re-try counter value is N or not. If the re-try counter value is N, the control circuit 12 proceeds to step $S8_1$. If the re-try counter value is not N, the control circuit 12 proceeds to step $S7_2$.

At step S8, in the case where it is confirmed that the re-try counter value is N, the control circuit 12 of the signal recording/reproducing device 1 carries out an operation A for affecting the reproducing characteristics of the signals, and adds a weighting coefficient "a" to the error counter value. Then, at step S9, the control circuit 12 subtracts 1 from the re-try counter value. The operation A is exemplified by re-try operation simply for reproducing the same sector with the same parameter again.

On the other hand, at step $S7_2$ in the case where it is confirmed that the re-try counter value is not N, the control circuit 12 discriminates whether the re-try counter value is N−1 or not. If it is confirmed that the re-try counter value is N−1, the control circuit 12 of the signal recording/ reproducing device 1 proceeds to step $S8_2$. If it is confirmed that the re-try counter value is not N−1, the control circuit 12 proceeds to step $S7_3$.

At step $S8_2$ in the case where it is confirmed that the re-try counter value is N−1, the control circuit 12 of the signal recording/reproducing device 1 carries out an operation B for affecting the reproducing characteristics of the signals, and adds a weighting coefficient "b" to the error counter value. Then, at step S9, the control circuit 12 subtracts 1 from the re-try counter value. The operation B is an operation for shifting tracking. Specifically, it is an operation for providing an offset by the mixing circuit 15 with respect to the output of the servo detection circuit 13 so that the magnetic head 3 carries out tracking at a position offset from the center of the recording track.

At step $S7_3$ in the case where it is confirmed that the re-try counter value is not N−1, the control circuit 12 of the signal recording/reproducing device 1 discriminates whether the re-try counter value is N−2 or not. If it is confirmed that the re-try counter value is N−2, the control circuit of the signal recording/reproducing device 1 proceeds to step $S8_3$.

At step $S8_3$ in the case where it is confirmed that the re-try counter value is N−2, the control circuit 12 of the signal recording/reproducing device 1 carries out an operation C for affecting the reproducing characteristics of the signals, and adds a weighting coefficient "c" to the error counter value. Then, at step S9, the control circuit 12 subtracts 1 from the re-try counter value. The operation C is an operation for changing the parameter of the equalizer 8.

At step $S7_{N-1}$, the control circuit 12 discriminates whether the re-try counter value is 2 or not. If it is confirmed that the re-try counter value is 2, the control circuit 12 of the signal recording/reproducing device 1 proceeds to step $S8_{N-1}$. If it is confirmed that the re-try counter value is not 2, that is, if it is confirmed that the re-try counter value is 1, the control circuit 12 proceeds to step $S8_N$.

At step $8_{N-1}$ in the case where it is confirmed that the re-try counter value is 2, the control circuit 12 of the signal recording/reproducing device 1 carries out an operation Y for affecting the reproducing characteristics of the signals, and adds a weighting coefficient "y" to the error counter value. On the other hand, at step $S8_N$ in the case where it is confirmed that the re-try counter value is 1, the control circuit 12 of the signal recording/reproducing device 1 carries out an operation Z for affecting the reproducing characteristics of the signals, and adds a weighting coefficient "z" to the error counter value.

As described above, the re-try counter value is discriminated, and the operation for affecting the reproducing characteristics of the signals is carried out in accordance with the discriminated re-try counter value. Also, the weighting coefficient corresponding to each of the steps $S8_1$ to $S8_N$ is added to the error counter value.

Specifically, as it goes from step $S8_1$ through steps $S8_2$, $S8_3$, ... $S8_{N-1}$ to step $S8_N$, the operation for affecting the reproducing characteristics of the signals more significantly, that is, the operation having a higher possibility of generation of noise and an erroneous signal but having a higher possibility of reproduction of the signals, is carried out. It is to be noted that the value of the weighting coefficient becomes greater at this point.

After the re-try operation corresponding to the re-try counter value, the addition of the corresponding weighting coefficient, and the subtraction of 1 from the re-try counter value at step S9 are carried out as described above, the control circuit 12 of the signal recording/reproducing device 1 causes the signal reproducing operation to be carried out again at step S3 shown in FIG. 11. The signal reproducing operation at this point is so set as to affect the reproducing characteristics of the signals in accordance with the re-try counter value.

Then, it is discriminated at step S4 whether or not the signals could be reproduced at step S3. If it is confirmed at step S4 that the signals could be reproduced, the control circuit 12 of the signal recording/reproducing device 1 proceeds to step S10 shown in FIG. 12. If it is confirmed that the signals could not be reproduced, the signal recording/reproducing device 1 proceeds to step S5 to discriminate the re-try counter value, thereby selecting the operation for error processing or re-try operation, as described above.

At step S10, the signal recording/reproducing device 1 causes the control circuit 12 to discriminate whether the number of correction bytes by ECC is 0 or not. If it is confirmed that the number of correction bytes by ECC is 0, the signal recording/reproducing device 1 proceeds to step S16. If it is confirmed that the number of correction bytes by ECC is not 0, the signal recording/reproducing device 1 proceeds to step S11.

At step S11 in the case where it is confirmed that the number of correction bytes by ECC is not 0, the control circuit 12 of the signal recording/reproducing device 1 discriminates whether the number of correction bytes by ECC is not less than 1 and not more than 5. If it is confirmed that the number of correction bytes by ECC is a value which is not less than 1 and not more than 5, the signal recording/reproducing device 1 proceeds to step S12. If it is confirmed that the number of correction bytes by ECC is not a value which is not less than 1 and not more than 5, the signal recording/reproducing device 1 proceeds to step S13.

At step S12 in the case where it is confirmed that the number of correction bytes by ECC is a value which is not less than 1 and not more than 5, the control circuit 12 of the signal recording/reproducing device 1 adds a weighting coefficient to the error counter value. For example, the control circuit 12 adds 3 as a weighting coefficient to the error counter value. Then, after adding the weighting coefficient, the control circuit 12 of the signal recording/reproducing device 1 proceeds to step S16.

At step S13 in the case where it is confirmed that the number of correction bytes by ECC is not a value which is not less than 1 and not more than 5, the control circuit 12 of the signal recording/reproducing device 1 discriminates whether the number of correction bytes by ECC is not less than 6 and not more than 10. If it is confirmed that the number of correction bytes by ECC is a value which is not less than 6 and not more than 10, the control circuit 12 of the signal recording/reproducing device 1 proceeds to step S14. If it is confirmed that the number of correction bytes by ECC is not a value which is not less than 6 and not more than 10, the control circuit 12 proceeds to step S15.

At step S14 in the case where it is confirmed that the number of correction bytes by ECC is a value which is not less than 6 and not more than 10, the control circuit 12 of the signal recording/reproducing device 1 adds a weighting coefficient to the error counter value. For example, the control circuit 12 adds 4 as a weighting coefficient to the error counter value. Then, after adding the weighting coefficient, the control circuit 12 of the signal recording/reproducing device 1 proceeds to step S16.

At step S15 in the case where it is confirmed that the number of correction bytes by ECC is not a value which is not less than 6 and not more than 10, the signal recording/reproducing device 1 adds a weighting coefficient to the error counter value. For example, 5 is added as a weighting coefficient to the error counter value. Then, after adding the weighting coefficient, the control circuit 12 of the signal recording/reproducing device 1 proceeds to step S16.

At step S16, the control circuit 12 of the signal recording/reproducing device 1 discriminates whether or not the error counter value is greater than a limit value $E_0$.

If it is confirmed that the error counter value is a value greater than the limit value $E_0$, the signal recording/reproducing device 1 proceeds to step S17. If it is confirmed that the error counter value is a value not greater than the limit value $E_0$, the signal recording/reproducing device 1 ends the processing.

At step S17, the control circuit 12 of the signal recording/reproducing device 1 records the signals stored in the buffer memory into an alternate sector, which is a normal sector, and then proceeds to step S18. At step S18, the control circuit 12 of the signal recording/reproducing device 1 updates the above-described logical address map so as to prevent the signals from being recorded into the sector which has lost the signal reproduction reliability. Then, the control circuit 12 ends the processing.

In the processing as shown in the flowcharts in reproducing the signals, the control circuit 12 of the signal recording/ reproducing device 1 accumulates the weighting coefficient as a quantitative reference in accordance with execution of the reproduction re-try operation and the error correction code appending processing. Then, when the accumulated weighting coefficient has reached the predetermined value $E_0$, the signals are rewritten into another normal sector, that is, a so-called alternate sector, thereby securing the reliability in the subsequent signal reproduction.

As the method for providing the above-described weighting coefficient, other than the above-described example, the number of errors per interleave of ECC, the drop-out length of the reproducing waveform, and the magnitude of the reproducing waveform amplitude are used as estimate parameters, and weighting coefficients may be provided to the respective parameters.

Also, the estimate value may be set in accordance with the reproducing operation, as shown in the following Table 1. Alternatively, the limit value $E_0$ is set at 7, and when this value is reached, the signals are recorded into the alternate sector to secure the reliability in the subsequent reproduction.

TABLE 1

| Read Operation | Estimate Value |
|---|---|
| Carry out re-try without changing the parameter | 1 |
| Carry out re-try with tracking shifted | 2 |
| Carry out re-try with the equalizer constant changed | 2 |
| The number of correction bytes by ECC is not less than 1 and not more than 5 | 3 |
| The number of correction bytes by ECC is not less than 6 and not more than 10 | 4 |
| The number of correction bytes by ECC is not less than 11 and not more than 14 | 5 |
| Estimation is used for detecting STM | 4 |

Figure 12:
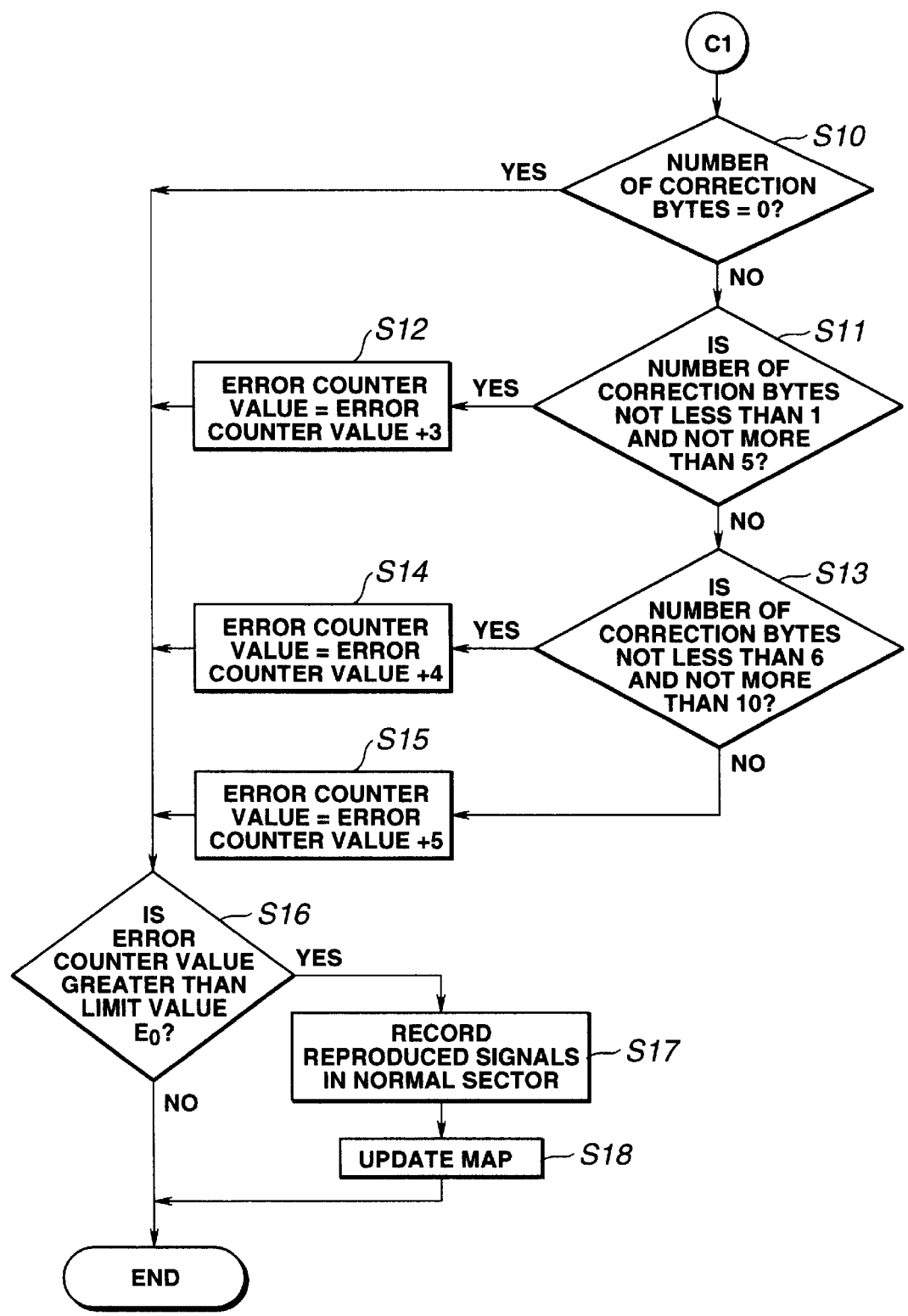
FIG. 12 is a flowchart for explaining the latter half of signal reproducing and recording processing by the signal recording/reproducing device, that is, for explaining operation for recording signals into an alternate sector in accordance with the error counter value.
Figure 14:
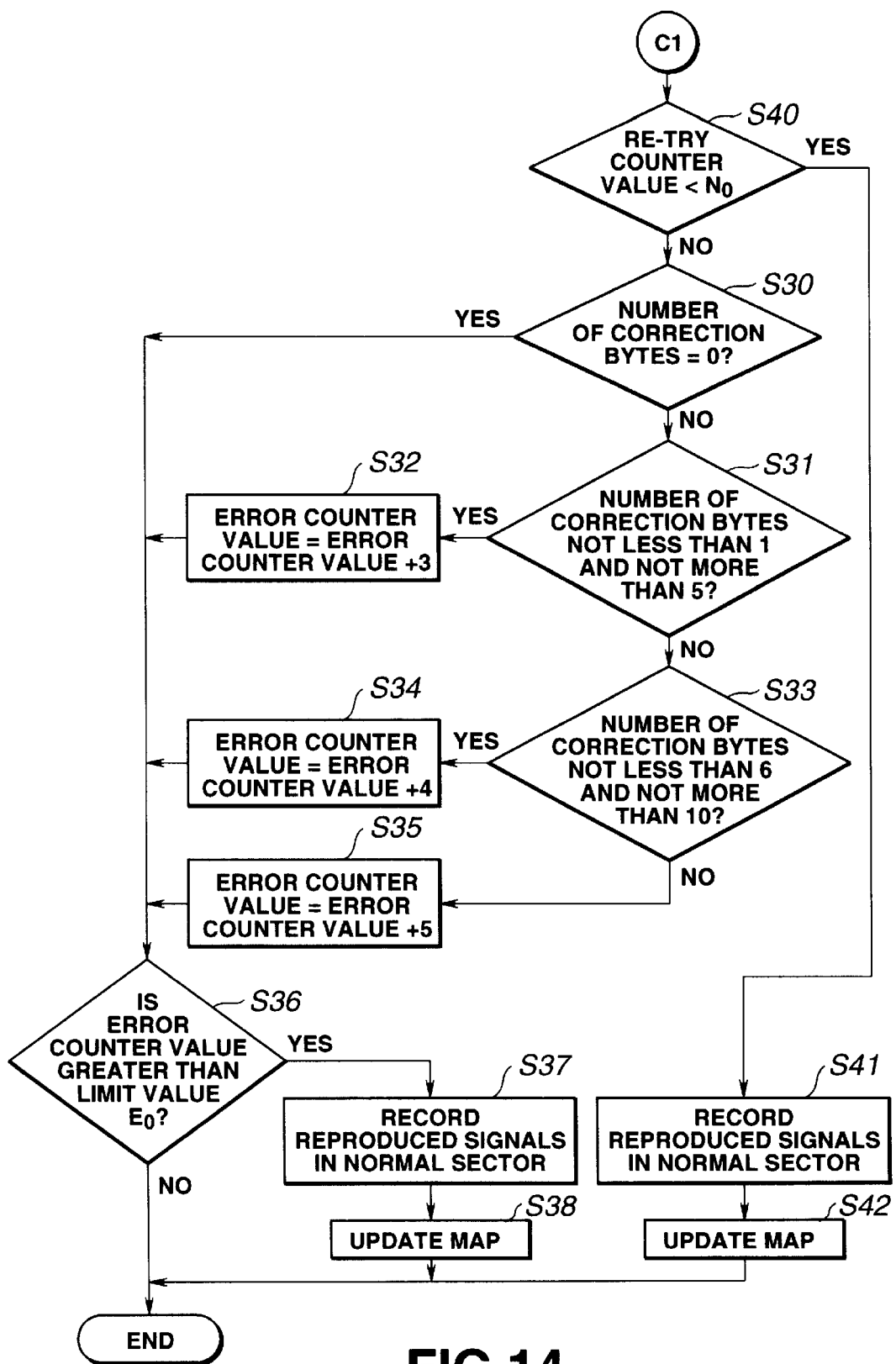
FIG. 14 is a flowchart for explaining operation for recording signals into an alternate sector in accordance with the re-try counter value and the error counter value, as another example of operation shown in FIG. 12.
Figure 15:
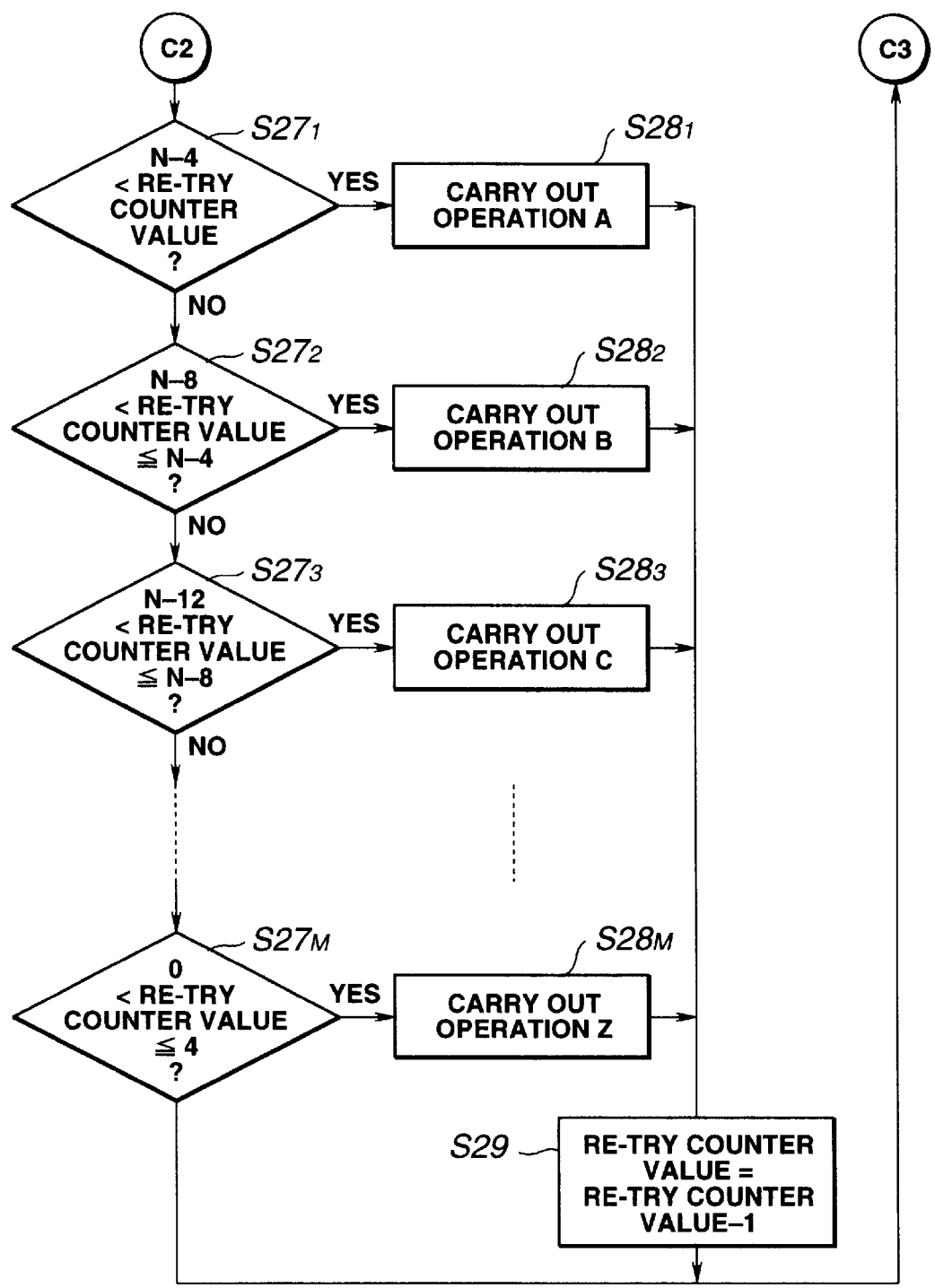
FIG. 15 is a flowchart for explaining various re-try operations in accordance with the re-try counter value, as another example of operation shown in FIG. 13.

FIGS. 14 and 15 show another specific example of the operation in the embodiment of the present invention, and can replace FIGS. 12 and 13, respectively. In the example shown in FIGS. 14 and 15, even when the parameter is changed, the control circuit 12 of the signal recording/reproducing device 1 repeats the re-try operation for several times with the same parameter. If the number of times the re-try operation is carried out is greater than a predetermined number (that is, if the re-try counter value is smaller than a predetermined value $N_0$), or if the error counter value is greater than the limit value $E_0$, the above-described alternate shift processing is carried out.

In this example, similar to the example of FIG. 11, the control circuit 12 of the signal recording/reproducing device 1 sets the initial value (that is, sets the error counter value at 0 and the re-try counter value at N) at the time of starting the reproducing operation. Then, the control circuit 12 causes the reproducing operation to be carried out, and discriminates whether or not the signals could be correctly reproduced. If the signals could be correctly reproduced, the control circuit 12 proceeds to step S40 shown in FIG. 14. If the signals could not be correctly reproduced, the control circuit 12 proceeds to step S271 shown in FIG. 15 when the re-try counter value is not 0.

At step S40 of FIG. 14, the control circuit 12 of the signal recording/reproducing device 1 discriminates whether or not the re-try counter value is smaller than a predetermined value $N_0$, that is, whether or not the number of times of the re-try operation exceeds $N-N_0$ times. This predetermined value $N_0$ may be approximately half the total number of times of the re-try operation N, that is, $N_0 = N/2$. If the number of times of the re-try operation is large and the discrimination result at step S40 is YES, the control circuit 12 of the signal recording/reproducing device 1 proceeds to step S41 to record the reproduced signals into a normal sector. Then, at the next step S42, the control circuit 12 updates the logical address map, thereby carrying out the above-described alternate shift processing. If the discrimination result at step S40 is NO, the control circuit 12 of the signal recording/reproducing device 1 carries out processing similar to that of FIG. 12 in accordance with step S30 and the subsequent steps. That is, steps S30 to S38 of FIG. 14 correspond to steps S10 to S18 of FIG. 12 and the similar processing is carried out. Therefore, the processing at these steps will not be described further in detail.

At step $S27_1$ of FIG. 15, the control circuit 12 of the signal recording/reproducing device 1 discriminates whether or not the re-try counter value is smaller than N−4. This processing is to discriminate whether or not the re-try operation has been carried out four times from the initial value N. In the four times of re-try reproduction, the control circuit 12 of the signal recording/reproducing device 1 proceeds to step $S28_1$ to carry out the same operation A. This operation A is an operation for setting the parameter affecting the reproducing characteristics, as described with reference to FIG. 13. However, it differs from the operation of FIG. 13 in that the re-try operation is carried out four times with the same parameter set for a plurality of times, for example, four times, that is, without changing the parameter. This operation A is similar to the operation of FIG. 13 in that decrement by one is made on the re-try counter value at step S29 every time the re-try operation is carried out and that the operation returns to step S3 of FIG. 11.

In FIG. 15, when the re-try counter value becomes N−4 or smaller, the control circuit 12 of the signal recording/reproducing device 1 proceeds to step $S27_2$ to discriminate whether the re-try counter value is greater than N−8 and not more than N−4. This operation is to discriminate which of the four times of re-try operation which are equivalent to the fifth to eighth re-try operations counted from the very first re-try operation. If the discrimination result is YES, the control circuit 12 proceeds to step $S28_2$ to carry out an operation B. This operation B is an operation for setting the parameter affecting the reproducing characteristics, as described with reference to FIG. 13, and the parameter set by this operation is different from the parameter set by the operation A. This operation B differs from the operation of FIG. 13 in that the re-try operation is carried out four times without changing the parameter of the operation B obtained by changing the parameter of the operation A. Similarly, the control circuit 12 of the signal recording/reproducing device 1 changes the parameter and then causes the re-try operation to be carried out for a plurality of times (for example, four times) using the same changed parameter. In this manner, the control circuit 12 causes the re-try operation up to N times in total. When the re-try operation is carried out N times in total, the control circuit 12 of the signal recording/reproducing device 1 obtains a discrimination result of NO at step $S27_M$, and then returns to step S3 of FIG. 11.

As described above, in the signal recording/reproducing device of the embodiment of the present invention, when the estimate value has reached a predetermined value, signals are rerecorded into another normal unit recording area. Thus, the reliability in the subsequent reproduction of information signals can be secured, and generation of such a state that information signals cannot be reproduced in the future can be prevented.

The present invention is not limited to the above-described embodiment. For example, the relation between the number of times of the re-try operation and the change of the parameter is not limited to that of the embodiment, and the relation between the number of error correction bytes and the error counter value is not limited to the example shown in the drawing. In addition, it is a matter of course that various modifications can be effected without departing from the scope of the present invention.

What is claimed is:

1. A signal recording/reproducing device comprising:
   reproduction means for reproducing information signals recorded in a signal recording area of a signal recording medium from each unit recording area;
   estimate value obtaining means for obtaining an estimate value indicating the difficulty of reproduction with respect to operation for reproducing the information signals from each unit recording area by the reproduction means;
   accumulation means for accumulating a plurality of estimate values obtained by the estimate value obtaining means until reproduction of the information signals from each unit recording area is correctly carried out; and
   recording means for recording the information signals recorded in a corresponding unit recording area into another unit recording area when the estimate value accumulated by the accumulation means has become a predetermined value or greater:
   wherein the estimate value obtaining means obtains a plurality of estimate values with respect to a plurality of reproducing operations of the reproduction means, and
   wherein the accumulation means accumulates the plurality of estimate values corresponding to the plurality of reproducing operations.

2. The signal recording/reproducing device as claimed in claim 1, wherein the estimate value obtaining means obtains an estimate value varying for each reproducing operation.

3. The signal recording/reproducing device as claimed in claim 1, wherein the reproduction means has a reproducing head and error correction means for carrying out error correction with respect to output signals of the reproducing head, and
   wherein the estimate value obtaining means obtains an estimate value corresponding to an error correction state by the error correction means, as one of the plurality of estimate values.

4. The signal recording/reproducing device as claimed in claim 3, wherein the estimate value obtaining means obtains an estimate value corresponding to the number of error corrections by the error correction means with respect to the output signals of the reproducing head.

5. The signal recording/reproducing device as claimed in claim 1, further comprising reproduction control means for controlling the operation for reproducing the information signals from each unit recording area by the reproduction means,
   the reproduction control means causing the reproduction means to repeatedly carry out the operation for reproducing the information signals, when the reproduction means cannot reproduce the information signals correctly,
   the accumulation means accumulating the estimate value obtained by the estimate value obtaining means in each reproducing operation by the reproduction means.

6. The signal recording/reproducing device as claimed in claim 5, wherein the reproduction means has a reproducing head and an equalizer adjusting characteristics of output signals of the reproducing head, and
   wherein the reproduction control means sequentially changes characteristics of the equalizer and causes the reproduction means to repeatedly carry out the operation for reproducing the information signals, when the reproduction means cannot reproduce the information signals correctly.

7. The signal recording/reproducing device as claimed in claim 5, wherein the unit recording area is formed along a recording track,
   the reproduction means having a reproducing head and tracking means for causing the reproducing head to follow the recording track,
   the reproduction control means sequentially changing an offset quantity of the tracking means with respect to a tracking target position and causing the reproduction means to repeatedly carry out the operation for reproducing the information signals, when the reproduction means cannot reproduce the information signals correctly.

8. The signal recording/reproducing device as claimed in claim 5, wherein the reproduction means has a reproducing head and error correction means for carrying out error correction with respect to output signals of the reproducing head to output the corrected signals as the information signals, and
   wherein the reproduction control means causes the reproduction means to repeatedly carry out the operation for reproducing the information signals, when the error correction means cannot carry out error correction with respect to the output signals of the reproducing head.

9. The signal recording/reproducing device as claimed in claim 5, wherein the unit recording area is formed along a recording track,
   the reproduction means having a reproducing head, an equalizer for adjusting characteristics of output signals of the reproducing head, and tracking means for causing the reproducing head to follow the recording track,
   the reproduction control means sequentially changing characteristics of the equalizer and an offset quantity of the tracking means with respect to a tracking target position, as the reproducing operation.

10. A fault control method for a signal recording area comprising the steps of:
    reproducing information signals recorded in a signal recording area of a signal recording medium from each unit recording area by reproduction means;
    detecting whether or not the information signals could be correctly reproduced by the reproduction means;
    changing a parameter related to reproducing operation of the reproduction means and repeatedly reproducing the unit recording area, when the information signals could not be correctly reproduced;
    obtaining an estimate value having a value corresponding to the parameter for each step of repeated reproduction;
    accumulating the estimate value; and
    recording the information signals recorded in the unit recording area into another unit recording area of the signal recording medium when the accumulated estimate value has become a predetermined value or greater.

* * * * *